US00H002280H

(19) United States
(12) Statutory Invention Registration
Hansen et al.

(10) Reg. No.: US H2280 H
(43) Published: Aug. 6, 2013

(54) IONOMERIC SHEETING IN ROLL FORM AND PROCESS FOR PRODUCING SAME

(75) Inventors: Steven M. Hansen, Wilmington, DE (US); Michael Jackson, Bladenboro, NC (US); Moses T. Lee, Fayetteville, NC (US); Vince D. Sutlic, Newark, DE (US)

(73) Assignee: E. I. du Pont de Nemours and Company, Wilmington, DE (US)

(21) Appl. No.: 12/975,204

(22) Filed: Dec. 21, 2010

Related U.S. Application Data

(60) Provisional application No. 61/291,339, filed on Dec. 30, 2009.

(51) Int. Cl.

| | |
|---|---|
| ***B32B 38/00*** | (2006.01) |
| ***B32B 38/04*** | (2006.01) |
| ***B32B 37/24*** | (2006.01) |
| ***B29C 47/14*** | (2006.01) |

(52) U.S. Cl. ..... 156/308.2; 156/184; 156/256; 264/210.1

(58) Field of Classification Search ..... 156/308.2, 156/184, 256; 264/210.1

See application file for complete search history.

(56) References Cited

U.S. PATENT DOCUMENTS

2011/0155303 A1 * 6/2011 Hansen et al. ..... 156/184

* cited by examiner

*Primary Examiner*—Daniel Pihulic
(74) *Attorney, Agent, or Firm*—Maria M. Kourtakis

(57) ABSTRACT

Provided herein is relatively thick ionomeric sheeting that can be taken up into a roll and supplied in continuous form. Also provided herein are methods of manufacturing rolls of relatively thick, continuous ionomeric sheeting. Further provided herein are methods of producing glass laminates, wherein the relatively thick ionomeric sheeting is not conditioned to reduce curvature prior to stacking the pre-press assembly. These continuous rolls eliminate costly cutting and stacking steps in ionomeric sheeting that is intended for use as interlayers in laminated structures, for example safety glass and photovoltaic cells.

20 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

IONOMERIC SHEETING IN ROLL FORM AND PROCESS FOR PRODUCING SAME

CROSS-REFERENCE TO RELATED APPLICATION

This application claims priority under 35 U.S.C. §119(e) to U.S. Provisional Appln. No. 61/291,339, filed on Dec. 30, 2009, which is incorporated herein by reference in its entirety.

FIELD OF THE INVENTION

The invention relates to relatively thick, continuous ionomeric sheeting that is wound up into rolls. Methods of manufacturing the thick, rolled ionomeric sheeting are also provided herein.

BACKGROUND OF THE INVENTION

Several patents and publications are cited in this description in order to more fully describe the state of the art to which this invention pertains. The entire disclosure of each of these patents and publications is incorporated by reference herein.

Ionomeric films are commonly supplied in roll form. These ionomer films, however, are usually intended to be converted into packaging, such as food or medical packaging, for example. In these applications, the packaging film may be required to do little more than shield the package contents from dirt, or prevent the packaged items from becoming separated. Therefore, the thickness of these ionomeric films may be very small, for example up to about 15 mil or about 400 micrometers.

When ionomeric sheets are used as interlayers in laminated structures, however, the required properties may be more stringent. For example, in safety laminates, impact resistance and penetration resistance are required. Load bearing ability may also be required, as when the laminates are used in staircases and viewing platforms. In photovoltaic devices, particularly in solar cell modules that are incorporated into windows, the properties required of the ionomeric encapsulant may be similar.

Therefore, the thickness of ionomeric sheets used as interlayers in safety laminates and as encapsulants in solar cell modules is generally substantial. Sheets having thicknesses of 30 to 120 mil (762 to 3048 micrometers) are commonly used in automotive and architectural applications. When greater penetration resistance is required, for example in architectural glazing for hurricane-prone areas or in bullet-resistant glass, thicknesses of up to 20 mm ($2.0\times10^5$ micrometers) may be necessary.

Ionomeric materials for use as interlayers and encapsulants have previously been supplied as sheets that are pre-cut to standard sizes that approximate the desired size of the laminated safety glass or photovoltaic device. This form is inconvenient and wasteful, however. In particular, the ionomeric materials are typically extruded as continuous sheeting, which is then trimmed to sheets of a uniform size. The trimmings are discarded or re-processed. Also, it is more difficult to count, stack, package and ship large numbers of flat sheets than it is to manufacture rolls of sheeting and transport the rolls to end users. In addition, pre-cut ionomeric sheets are generally interleaved between glass lites by hand to form the individual pre-press assemblies that are adhered together through heat and pressure to form the safety glass laminate or photovoltaic device. Providing the ionomer as a roll of sheeting enables semi-continuous automated methods of producing these laminates.

Accordingly, there remains a need to develop new forms of ionomeric sheets, in particular, relatively thick ionomeric sheeting that can be taken up into a roll and supplied in continuous form.

SUMMARY OF THE INVENTION

Provided herein is relatively thick ionomeric sheeting that can be taken up into a roll and supplied in continuous form. Also provided herein are methods of manufacturing rolls of relatively thick, continuous ionomeric sheeting. Further provided herein are methods of producing glass laminates, wherein the relatively thick ionomeric sheeting is not conditioned to reduce curvature prior to stacking the pre-press assembly.

The advantages and features of novelty that characterize the invention are pointed out with particularity in the claims annexed hereto and forming a part hereof. For a better understanding of the invention, its advantages, and the objects obtained by its use, however, reference should be made to the drawings which form a further part hereof, and to the accompanying descriptive matter, in which there is illustrated and described one or more preferred embodiments of the invention.

DETAILED DESCRIPTION OF THE INVENTION

Figure 1:
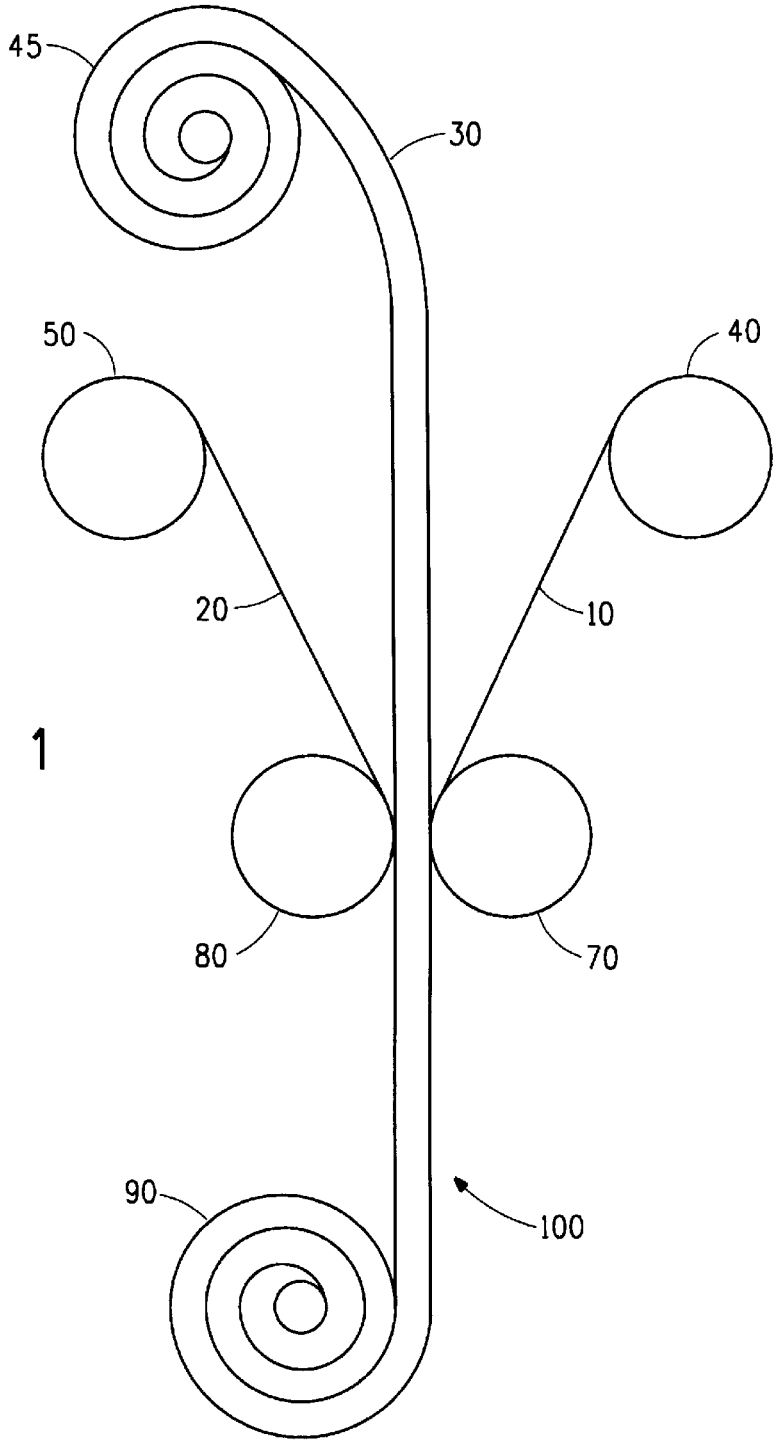
FIG. 1 is a side view of three individual layers being combined in a continuous roll-to-roll process.

The following definitions apply to the terms as used throughout this specification, unless otherwise limited in specific instances.

The technical and scientific terms used herein have the meanings that are commonly understood by one of ordinary skill in the art to which this invention belongs. In case of conflict, the present specification, including the definitions herein, will control.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format.

Optional additives as defined herein, at a level that is appropriate for such additives, and minor impurities are not excluded from a composition by the term "consisting essentially of".

When a composition, a process, a structure, or a portion of a composition, a process, or a structure, is described herein using an open-ended term such as "comprising," unless otherwise stated the description also includes an embodiment that "consists essentially of" or "consists of" the elements of the composition, the process, the structure, or the portion of the composition, the process, or the structure.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; that is, the phrase "A or B" means "A, B, or both A and B". Exclusive "or" is designated herein by terms such as "either A or B" and "one of A or B", for example.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately described. The scope of the invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

Unless stated otherwise, all percentages, parts, ratios, and like amounts, are defined by weight.

Finally, the term "ionomer" as used herein refers to a polymer that comprises ionic groups that are carboxylates associated with cations, for example, ammonium carboxylates, alkali metal carboxylates, alkaline earth carboxylates, transition metal carboxylates and/or mixtures of such carboxylates. Such polymers are generally produced by partially or fully neutralizing the carboxylic acid groups of precursor or parent copolymers that are acid copolymers, for example by reaction with a base.

Provided herein is relatively thick, continuous ionomeric sheeting that may be taken up into rolls. The ionomeric sheeting comprises an ionomeric material. Ionomeric materials are known for use as interlayers in safety glass laminates and as solar cell encapsulant materials. See, for example, U.S. Pat. Nos. 3,264,272; 3,344,014; 5,476,553; 5,478,402; 5,733,382; 5,741,370; 5,762,720; 5,986,203; 6,114,046; 6,187,448; 6,353,042; 6,320,116; and 6,660,930; and U.S. Patent Appln. Publn. Nos. 2003/0000568; 2005/0279401; 2008/0017241; 2008/0023063; 2008/0023064; and 2008/0099064. In addition to their controllable clarity and ease of processing, ionomers have stable mechanical properties that render them suitable for use in laminates such as safety glass and solar cell modules.

Turning now to chemical compositions, suitable ionomeric materials include an ionomer. Suitable ionomers are neutralized derivatives of a precursor acid copolymer comprising copolymerized units of an α-olefin having 2 to 10 carbon atoms and copolymerized units of an α,β-ethylenically unsaturated carboxylic acid having 3 to 8 carbons. The ionomers may comprise 40 wt % to 90 wt % of the copolymerized α-olefin and 10 wt % to 60 wt % of the copolymerized carboxylic acid, based on the total weight of the precursor acid copolymer. Preferably, the ionomers comprise 65 to 90 wt % or 70 to 85 wt % of the copolymerized α-olefin and 10 to 35 wt % or 15 to 30 wt % of the copolymerized carboxylic acid, and more preferably 75% to 80% of the copolymerized α-olefin and 20% to 25% of the copolymerized carboxylic acid.

Suitable α-olefin comonomers include, without limitation, ethylene, propylene, 1-butene, 1-pentene, 1-hexene, 1-heptene, 3-methyl-1-butene, 4-methyl-1-pentene, and the like and combinations of two or more of these comonomers. Preferably, the α-olefin is ethylene.

Suitable α,β-ethylenically unsaturated carboxylic acid comonomers include, without limitation, acrylic acids, methacrylic acids, itaconic acids, maleic acids, maleic anhydrides, fumaric acids, monomethyl maleic acids, and combinations of two or more of these acids. Preferably, the α,β-ethylenically unsaturated carboxylic acid is selected from acrylic acids, methatrylic acids, and combinations of two or more of these acids. Acrylic acid and methacrylic acid are more preferred acids.

The precursor acid copolymers may further comprise copolymerized units of one or more other comonomer(s), such as unsaturated carboxylic acids having 2 to 10, or preferably 3 to 8 carbons, or derivatives thereof. Suitable acid derivatives include acid anhydrides, amides, and esters. Some suitable precursor acid copolymers further comprise an ester of the unsaturated carboxylic acid. Examples of suitable esters of unsaturated carboxylic acids include, but are not limited to, those that are set forth in U.S. Patent Appln. No. 12/610,678, filed on Nov. 2, 2009. Examples of preferred comonomers include, but are not limited to, methyl acrylates, methyl methacrylates, butyl acrylates, butyl methacrylates, glycidyl methacrylates, vinyl acetates, and mixtures of two or more of these comonomers. Preferably, however, the precursor acid copolymer does not incorporate other comonomers.

When a laminate having low haze is desired, the precursor acid copolymer may have a melt flow rate (MFR) of about 1 to about 1000 g/10 min, preferably about 20 to about 900 g/10 min, more preferably about 60 to about 700 g/10 min, yet more preferably of about 100 to about 500 g/10 min, yet more preferably of about 150 to about 300 g/10 min, and most preferably of about 200 to about 250 g/10 min, as determined in accordance with ASTM method D1238 at 190° C. and 2.16 kg. The more preferable and most preferable MFR ranges of the precursor acid copolymers allow the resulting ionomer to have a high neutralization level, which in turn provides low haze, high clarity, and excellent processability in the subsequent sheet production process.

When a measurable or significant level of haze is tolerable, however, the precursor acid copolymer preferably has a melt flow rate of about 60 g/10 min or less, more preferably about 45 g/10 min or less, yet more preferably about 30 g/10 min or less, or most preferably about 25 g/10 min or less, as measured by ASTM method D1238 at 190° C. and 2.16 kg.

The precursor acid copolymers may be polymerized as described in U.S. Pat. Nos. 3,404,134; 5,028,674; 6,500,888; or 6,518,365, for example. They may be neutralized by any suitable procedure, such as those described in U.S. Pat. Nos. 3,404,134 and 6,518,365.

To obtain the ionomer useful in the ionomeric materials, the precursor acid copolymer is preferably neutralized to a level of about 5% to about 90%, or preferably about 10% to about 60%, or more preferably about 20% to about 55%, or yet more preferably about 35% to about 55%, or most preferably about 40% to about 55%, based on the total carboxylic acid content of the precursor acid copolymers as calculated or measured for the non-neutralized precursor acid copolymers. The more preferable and most preferable neutralization ranges make it possible to obtain an ionomeric sheet having one or more desirable properties such as low haze, high clarity, sufficient impact resistance, and good processability.

Any cation that is stable under the conditions of polymer processing and laminate fabrication is suitable for use in the ionomers. Ammonium cations are suitable, for example. Metal ions are preferred cations. The metal ions may be monovalent, divalent, trivalent, multivalent, or combinations of cations having two or more different valencies. Useful monovalent metal ions include but are not limited to ions of sodium, potassium, lithium, silver, mercury, copper, and the like, and combinations of two or more of these cations. Useful divalent metal ions include but are not limited to ions of beryllium, magnesium, calcium, strontium, barium, copper, cadmium, mercury, tin, lead, iron, cobalt, nickel, zinc, and the like, and combinations of two or more of these cations. Useful trivalent metal ions include but are not limited to ions of aluminum, scandium, iron, yttrium, and the like, and combinations of two or more of these cations. Useful multivalent metal ions include but are not limited to ions of titanium, zirconium, hafnium, vanadium, tantalum, tungsten, chromium, cerium, iron, and the like, and combinations of two or more of these cations. It is noted that when the metal ion is multivalent, complexing agents such as stearate, oleate, salicylate, and phenolate radicals may be included, as described in U.S. Pat. No. 3,404,134. The metal ions are preferably monovalent or divalent metal ions. In one preferred ionomer, the metal ions are selected from cations of sodium, lithium, magnesium, zinc, potassium and combinations of two or more of these cations. In another preferred ionomer, the metal ions are selected from sodium cations, zinc cations and combinations of sodium and zinc cations. Zinc is a preferred cation when resistance to the incursion of moisture is required.

The ionomer used in the ionomeric material may have a MFR of 0.75 to about 20 g/10 min, preferably about 1 to about 10 g/10 min, yet more preferably about 1.5 to about 5 g/10 min, and most preferably about 2 to about 4 g/10 min, as determined in accordance with ASTM method D1238 at 190° C. and 2.16 kg.

Some preferred ionomeric materials are easily processable into low haze, high clarity ionomeric sheeting. In particular, the low haze, high clarity interlayers are provided by ionomers with a high neutralization level, such as the most preferable neutralization level of from about 40 to about 55% described above. It is well known that the MFR of an ionomer is reduced (the ionomer becomes more viscous) as its neutralization level is increased. As described herein, the high MFR precursor acid copolymers allow the resulting ionomer to attain high neutralization levels while maintaining good processability during melt processes such as sheeting. For example, when an ionomer has a MFR below about 0.75 g/10 min, it can become difficult to process through extrusion casting operations, and heat generated by shear stress may cause significant thermal degradation. As re-grind is common in sheeting processes, maintaining the ionomer at a relatively higher MFR level (e.g., not less than about 0.75 g/10 min) is desirable.

In one preferred laminate, the ionomer(s) used in the ionomeric materials are selected from among the low haze, high clarity ionomers described in U.S. Patent Appln. Nos. 12/610,678, cited above, or 12/610,881, filed on Nov. 2, 2009.

In addition, suitable ionomeric materials in pre-cut sheet form are commercially available from E.I. du Pont de Nemours and Company of Wilmington, DE (hereinafter "DuPont"), under the SentryGlas® trademark. Also suitable and commercially available are the DuPont™ PV series of encapsulant sheets, such as PV5300 Series.

The ionomeric materials may further include one or more additives. For example, initiators such as dibutyltin dilaurate may also be present in the ionomeric material at a level of about 0.01 to about 0.05 wt %, based on the total weight of the ionomeric material. In addition, if desired, inhibitors, such as hydroquinone, hydroquinone monomethyl ether, p-benzoquinone, and methylhydroquinone, may be added for the purpose of enhancing control of the ionomeric material's reactivity and stability. Typically, the inhibitors and initiators are added at a level of less than about 5 wt %, based on the total weight of the ionomeric material.

The ionomeric materials may further contain other additives that effectively reduce the melt flow of the resin. These additives may be present in any amount that permits production of thermoplastic articles. That is, the melt-flow reducing additives may be present in any amount that does not result in an ionomeric material that is intractable, or one that cannot be processed in the melt. The use of such additives will enhance the upper end-use temperature, reduce creep and generally increase the dimensional stability of the light-concentrating article derived therefrom. Typically, the end-use temperature of the ionomer composition may be increased by up to about 20 to 70° C., resulting in an end-use temperature of 120° C. or greater.

Typical effective melt flow reducing additives are organic peroxides, such as 2,5-dimethylhexane-2,5-dihydroperoxide, 2,5-dimethyl-2,5-di(tert-butylperoxy) hexane-3, di-tert-butyl peroxide, tert-butylcumyl peroxide, 2,5-dimethyl-2,5-di(tert-butylperoxy)hexane, dicumyl peroxide, alpha, alpha'-bis(tert-butyl-peroxyisopropyl )benzene, n-butyl-4,4-bis(tert-butylperoxy) valerate, 2,2-bis (tert-butylperoxy)butane, 1,1-bis(tert-butyl-peroxy) cyclohexane, 1,1-bis(tert-butylperoxy)-3,3,5-trimethylcyclohexane, tert-butyl peroxybenzoate, benzoyl peroxide, and the like and mixtures or combinations thereof. Preferably the organic peroxides decompose at a temperature of about 100° C. or higher to generate radicals. More preferably, the organic peroxides have a decomposition temperature which affords a half life of 10 hours at about 70° C. or higher to provide improved stability for blending operations. The organic peroxides may be added at a level of about 0.01 to about 10 wt %, or preferably, about 0.5 to about 3 wt %, based on the total weight of the ionomeric materials.

Silanes are additives that promote adhesion and cross-linking. Examples of silane coupling agents that are useful in the ionomeric materials include, but are not limited to, γ-chloropropylmethoxysilane, vinyltrimethoxysilane, vinyltriethoxysilane, vinyl-tris(β-methoxyethoxy) silane,γ-vinylbenzylpropyl trimethoxysilane, N-β-(N-vinylbenzyl aminoethyl)-γ-aminopropyltrimethoxysilane, γ-methacryloxypropyl trimethoxysilane, vinyltriacetoxysilane, γ-glycidoxypropyl trimethoxysilane, γ-glycidoxypropyl triethoxysilane, β-(3,4-epoxycyclohexyl) ethyltrimethoxy silane, vinyltrichlorosilane, γ-mercaptopropylmethoxysilane, γ-aminopropyl triethoxy silane, N-β-(aminoethyl)-γ-aminopropyltrimethoxysilane. Also suitable are the silane coupling agents described in U.S. Patent Appln. Publn. Nos. 2007/0267059; 2008/0108757 and 2008/0169023. More preferred are ethoxysilanes, including dimethoxysilanes such as $(CH_3O)_2SiRR'$, diethoxysilanes such as $(CH_3CH_2O)_2SiRR'$ and triethoxysilanes such as $(CH_3CH_2O)_3SiR$, and, more generally, dialkoxysilanes such as (RO)(R'O)SiR"R'". Other suitable silanes are described in U.S. Pat. Publn. Nos. 2006/352,789 and 1999/320,995. Moreover, two or more suitable silanes may be used in combination in the ionomeric materials. The silane coupling agents are preferably incorporated in the ionomeric material at a level of about 0.01 to about 5 wt %, or more preferably about 0.05 to about 1 wt %, based on the total weight of the ionomeric material.

In addition, initiator(s) alone, peroxide(s) alone, silane(s) alone, or combinations of two or more of at least one silane, at least one peroxide and at least one initiator may be used in the ionomeric materials.

In this connection, and as discussed above, dimensional stability is an important property of the components of a laminate such as a safety laminate or a solar cell module. Therefore, in some ionomeric materials, it is preferred to use a crosslinking agent to increase the dimensional stability of the interlayer sheet. For the sake of process simplification and ease, however, it may be preferred that cross-linking additives be omitted from the ionomeric materials.

Other additives of note include thermal stabilizers, UV absorbers and hindered amine light stabilizers. Suitable and preferred additives, levels of the additives in ionomer compositions, and methods of incorporating the additives into the ionomeric materials are described at length in U.S. Patent Appln. No. 12/610,678, cited above.

The ionomeric materials may also contain one or more other additives known in the art. The additives include, but are not limited to, processing aids, flow enhancing additives, lubricants, pigments, dyes, flame retardants, impact modifiers, nucleating agents, anti-blocking agents such as silica, UV stabilizers, dispersants, surfactants, chelating agents, other coupling agents, and reinforcement additives, such as glass fiber, fillers, and the like, and mixtures or combinations of two or more conventional additives. These additives are described in the *Kirk Othmer Encyclopedia of Chemical Technology,* $5^{th}$ Edition, John Wiley & Sons (New Jersey, 2004), for example. Moreover, the incorporation of such conventional ingredients into the ionomeric materials can be carried out by any known process. This incorporation can be carried out, for example, by dry blending, by extruding a mixture of the various constituents, by the masterbatch technique, or the like. See, again, the *Kirk-Othmer Encyclopedia.*

The ionomer sheeting provided herein has a thickness of 20 mils (508 micrometers) to 20 mm; greater than 20 mils (508 micrometers) to 20 mm; preferably 25 mils (635 micrometers) to 1.0 mm; more preferably 25 mils (635 micrometers) to 0.50 mm, 120 mils (3048 micrometers), or 90 mils (2286 micrometers); and still more preferably 30 to 67 or 70 mils (762 to1702 or 1778 micrometers).

The ionomer sheeting provided herein has a width that is generally determined by the width of the die through which the ionomeric material is extruded to form the sheeting. Some preferred dies are capable of forming sheets that are 70" to 100" (178 cm to 254 cm) in width and 25 to 90 mils (0.63 mm to 2.3 mm) in thickness. Other preferred dies can form sheets that are about 100" (178 cm) in width and about 0.38 mils (1.0 mm) in thickness. Still other preferred dies have widths of 50" to 55" (127 cm to 139.7 cm), 75" to 80" (190.5 cm to 203.2 cm), or 39.4" to 59.1" (100 cm to 150 cm), which are preferred for photovoltaic cells; and 72 to 78" (182.9 cm to 198.1 cm) or 90.6" (230 cm), which are preferred for architectural glazing. Dies having wider widths, for example a width of 140" (317 cm), are also available, though not commonly used for extruding ionomer sheets. In addition, the width of an as-extruded sheet may be reduced by methods such as slitting the film or cutting the roll. Similarly, any bead that forms as a result of necking near the edge of the die may be trimmed from the as-extruded sheet.

The ionomer sheeting provided herein is continuous. The term "continuous", as used in this context, means that the sheeting has a length of at least about 3 m, at least about 10 m, at least about 50 m, at least about 100 m, or at least about 250 m. Moreover, the sheeting has an aspect ratio, that is, a ratio of length to width, that is at least 5, at least 10, at least 25, at least 50, at least 75 or at least 100.

Preferably, one or both surfaces of the ionomer sheeting described herein are textured, to facilitate the removal of air in a lamination process. Textures or patterns are generally applied by embossing, as by contact with a patterned roller, or by controlling the conditions of melt extrusion so that the sheeting bears a melt fracture pattern. Suitable surface patterns and means of applying the surface patterns are described in U.S. Pat. Nos. 6,800,355 and 7,851,694; in U.S. Patent Appln. Publn. No. 2008/0157426; and the references cited therein, for example.

Finally, the ionomer sheeting provided herein may be taken up into a roll. The roll may be self-supporting, that is, it may be based on an initial turn or fold of the ionomer sheeting in the machine direction, around which the remainder of the length of the sheeting is wound. Alternatively, the roll may be supported by a core. The core is a stable cylinder around which the length of the sheeting is wound. The ionomeric sheeting may be attached to the core by forces of friction, by an adhesive, or by adhesive tape. The inner diameter of the core may be determined by the requirements of the machinery upon which the roll will subsequently be processed. The outer diameter of the core may range from approximately zero (self-supported roll) to up to about 1.0 meter. Preferably, the outer diameter of the core ranges from approximately 2 inches (5.1 cm) to about 24 inches (61.0 cm) or about 18 inches (45.7 cm), and more preferably from approximately 3 (7.6 cm) or 4 inches (10.2 cm) to about 8 inches (20.3 cm) or 10 inches (254.0 cm).

Those of skill in the art are aware that sheeting of smaller thickness is capable of being wound about a core of a smaller radius, while sheeting of greater thickness may require a core of greater radius. Briefly, if the ionomeric sheeting is strained beyond its yield point, as for example by bending a thick sheet to conform to a small radius, the material may deform irreversibly. This result is generally undesirable for the ionomer sheeting described herein, which may be intended for use in laminates that are typically flat, such as safety glass windows for architectural uses. Other undesirable deformations may be reversible, for example those caused by primary and secondary crystallization. Finally, undesirable deformation due to primary crystallization may be largely preventable.

When the deformation is reversible, it may be desirable to condition the wound-up polymeric sheeting in order to remove the curvature. This conditioning might include one or more methods such as pressing the sheeting between flat plates, heating the sheeting, tentering the sheeting, bending the sheeting around a cylinder in the direction opposite its original curvature, and the like. Any of these measures adds expense and complication to the lamination process, however.

Compositional approaches to preventing or reducing irreversible deformation of ionomeric materials include introducing an ester of an alpha, beta-unsaturated carboxylic acid as a comonomer. In general, a copolymerized ester will reduce the modulus of an ionomer. The ionomers' high modulus leads to many favorable properties, such as toughness, however. Therefore, this approach may also be disadvantageous.

Accordingly, further provided herein are processes for manufacturing the relatively thicker, continuous ionomeric sheeting and winding the sheeting on rolls. Advantageously, it is not necessary to condition the ionomeric sheeting described herein prior to the lamination process to reduce its curvature. In general, these manufacturing processes are extrusion processes or extrusion casting processes, similar to the processes that are used to make thinner ionomeric films that are suitable for use as packaging materials. Such processes are described in reference texts such as, for example, the *Kirk Othmer Encyclopedia*; the *Modern Plastics Encyclopedia*, McGraw-Hill, New York, N.Y. 1995; or the *Wiley Encyclopedia of Packaging Technology,* 2d edition, A. L. Brody and K. S. Marsh, Eds., Wiley-Interscience (Hoboken, 1997).

Importantly, the equipment that is used in the processes described herein is standard extrusion, sheeting and winding equipment. Several particular considerations apply to the fabrication of thicker wound sheeting, however. For the most part, these considerations result from the lower cooling rate of thicker sheeting. In addition, the curvature of the rolled sheeting may set if the temperature of the sheeting is too high when it is being wound. Accordingly, it may be expedient to increase the rate at which heat is removed from the extruded sheeting, for example by adding a chilled water roll; by decreasing the temperature of the chilled water roll; by increasing air flow across the extruded sheeting; or by slowing the extrusion rate to allow more time for the temperature of the extruded sheeting to decrease before it is wound. For example, the tension control may need to be adjusted so that the warmer and therefore more pliable extruded sheeting is not deformed or made thinner by excessive forces in the machine direction. Also, if the thicker extruded sheeting is too hot to emboss when it reaches the usual embossing station, then the placement of the calender roll may need to be altered by moving it closer to the winding apparatus. One or more of these adaptations may be necessary to design a successful process to extrude and roll a thicker sheet while reducing or eliminating the heat-selling of its curvature.

The ionomeric sheeting described herein may be used as an interlayer in a safety laminate or as an encapsulant in a solar cell module. Safety laminates and solar cell modules have been described in detail elsewhere. See, for example, U.S. Patent Appln. Nos. and 12/610,431 and 12/610,688, filed on Nov. 2, 2009, and the references cited therein. Briefly, however, a simple safety laminate may have a layered structure including a first glass sheet, an interlayer, and a second glass sheet. One or both of the glass sheets may be replaced by another material, such as a ceramic sheet or a polyester film, such as a poly(ethylene terephthalate) (PET) film or a biaxially oriented PET film. When the safety laminate is intended for use as a window or windshield, all of the layers are preferably transparent, with low haze and high clarity. A simple solar cell module may have a layered structure including a glass sheet, a first encapsulant layer, a layer of electronics, including the solar cell and any associated wiring, a second encapsulant layer, and a second glass sheet. Traditional solar cells, such as silicon wafers and the associated wires and bus bars, may be placed among the solar cell module's other layers prior to lamination. Thin film solar cells and some of their associated electrical connections may be deposited directly on a substrate, in which case the layer structure of the solar cell module is the substrate, the encapsulant, and the glass sheet. Again, one or both of the glass sheets in a solar cell module may be replaced by another material, as appropriate depending on the intended use of the solar cell module.

Safety laminates and solar cell modules are usually produced by lamination procedures. Standard lamination procedures have been described in detail, for example in the *Kirk Othmer Encyclopedia* (Nichols, R. Terrell, and Sowers, Robert M., "Laminated Materials, Glass", published on-line on Sep. 18, 2009). Briefly, however, in one suitable process, the component layers of the laminate are stacked in the desired order to form a pre-lamination assembly. The assembly is then placed into a vacuum bag, the air is drawn out of the vacuum bag, and the bag is sealed under vacuum. The sealed bag is placed in an autoclave. The pressure in the autoclave is raised to about 150 to about 250 psi (about 11.3 to about 18.8 bar), the temperature is raised to about 130° C. to about 180° C., and these conditions are held for about 10 mm to about 50 min. Following the heat and pressure cycle, the air in the autoclave is cooled, then the autoclave is vented to the atmosphere and the laminates are removed from the autoclave.

The laminates may also be produced through non-autoclave processes. Suitable non-autoclave processes are described, e.g., in U.S. Pat. Nos. 3,234,062; 3,852,136; 4,341,576; 4,385,951; 4,398,979; 5,536,347; 5,853,516; 6,342,116; and 5,415,909, U.S. Patent Publication No. 20040182493, European Patent No. EP1235683 B1, and PCT Patent Publication Nos. WO9101880 and WO03057478. Generally, the non- autoclave processes include heating the pre-lamination assembly and the application of vacuum, pressure or both. For example, the assembly may be successively passed through heating ovens and nip rolls.

Significantly, the thick, wound-up ionomeric sheets described herein are not deformed to an extent that interferes with standard lamination processes. Advantageously, therefore, no conditioning is necessary to remove the curvature of the wound-up ionomeric sheeting described herein before it is processed to produce a safety laminate or a photovoltaic device. In particular, if the curvature of a polymeric sheet is excessive, then one of skill in the art might expect adverse consequences in a lamination process. For example, if sheets cut from wound-up rolls do not lie flat, the layers in the pre-lamination assembly may be misaligned. The pre-lamination assemblies might require additional stabilization, for example clamping or taping the exterior of the assembly. Alternatively, adhesives might be applied between the individual layers of the assembly. The thick ionomeric sheeting described herein and the sheets that are cut from the sheeting can be stacked and laminated without any additional stabilization, however.

Moreover, this low level of easily reversible curvature renders the relatively thick, continuous ionomeric sheeting described herein suitable for use in a continuous or semi-continuous lamination that includes roll-to-roll processing. Roll-to-roll processing has been described, for example, in Krebs, Frederick C., "Fabrication and processing of solar cells: A review of printing and coating techniques," *Solar Energy Materials and Solar Cells,* 2009, 93, 394-412 ("Krebs I"); Krebs, Frederick C., "Polymer solar cell modules prepared using roll-to-roll methods: Knife-over-edge coating, slot-die coating and screen printing," *Solar Energy Materials and Solar Cells,* 2009, 93, 465-475; and Krebs, Frederick C. et al., "A roll-to-roll process to flexible polymer solar cells: model studies, manufacture and operational stability studies," *J. Mater. Chem.,* 2009, 19, 5442-5451.

Briefly, however, in a continuous roll-to-roll lamination process, multilayer products may be formed by simultaneously unrolling two or more individual layers, aligning and optionally adhering them, and then taking up the multilayer product on a new roll. In a semi-continuous roll-to-roll lamination process, at least one layer of the multilayer products is neither wound nor unwound together with the other layers. Rather, it is presented in discrete portions. Therefore, at least one flexible layer is unwound, aligned with and optionally adhered to other flexible layers, if used, and to these discrete portions. Although the continuous and the semi-continuous lamination processes are described herein as discrete processes, they may alternatively be a subset of an integrated process. The terms "discrete" and "integrated", when used herein with respect to processes, are as defined in Krebs I (section 2.2 and FIG. 10 on page 403).

Referring now to the drawings, wherein like reference numerals designate corresponding structure throughout the views, and referring in particular to FIG. 1, a film 10, for example a PET film upon which thin layers of photoelectrically active materials and associated electrical connections have been deposited, is wound up on a roll 40. Thick ionomer sheeting 30 is wound up on roll 45. Optionally, a second film 20 may be wound up on roll 50. The roll 40 of film 20 may then be unwound simultaneously with ionomer sheet 30 and aligned to form a flexible prelaminate assembly. Optional sheet 20 may also be unwound and incorporated into the flexible prelaminate assembly. The layers 10, 20, 30 may be adhered to form a flexible multilayer laminate solar cell structure 100. Suitable means of adhesion include the application of one or more of an adhesive, heat or pressure. For example, the unadhered layers 10, 20, 30 may be passed through an oven whose temperature is above the softening point of the ionomer, and then passed through a nip roll 70, 80. After these procedures, the adhered multilayer structure 100 may be cut to the desired sizes, for example with a die or a die roll. Alternatively, the flexible prelaminate assembly or the adhered multilayer structure 100 may be wound up on a new roll 90 and stored or shipped for later processing.

Figure 2:
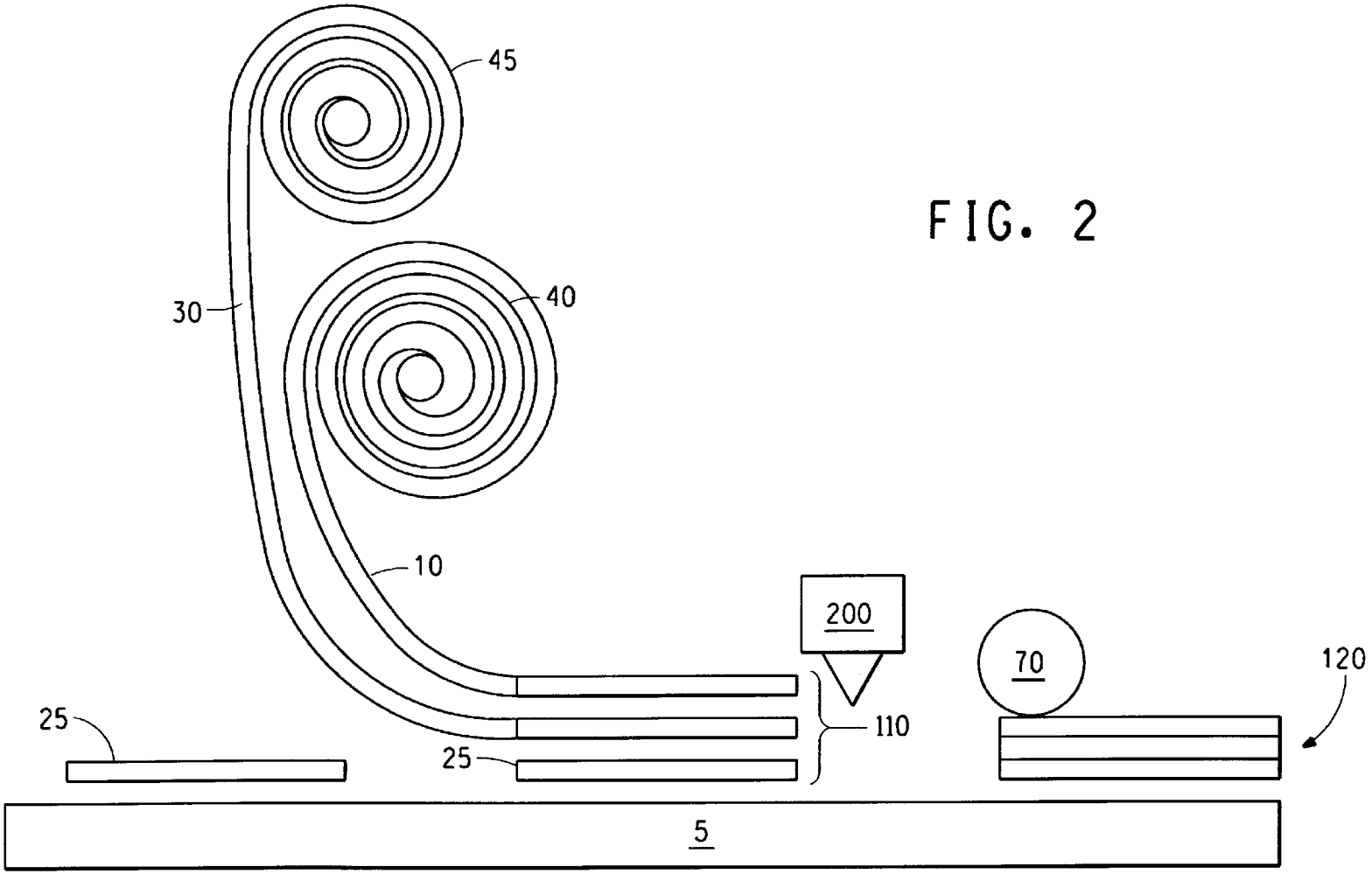
FIG. 2 is a fragmentary side view of three individual layers being combined in a semi-continuous roll-to-roll process.

Referring now to FIG. 2, in a semi-continuous roll-to-roll lamination process, one layer is supplied in discrete portions 25. It may be convenient, for example, for a rigid layer, such a glass or polymeric layer which may be neither wound nor unwound, to be supplied in the form of discrete portions 25. For example, sheets of glass 25 may be transported, as on a belts, to a position from which the thick ionomer sheet 30 may be unwound from roll 45 upon the surface of the glass sheets 25. In this configuration, glass sheets 25 of different sizes may be combined with the ionomer sheet 30. Optionally, one or more other films 10 may also be unwound from one or more other rolls 40 and combined with the glass layer 25 and the ionomer sheet 30 to form a prelaminate assembly 110. For example, a PET film 10 may be unwound upon the surface of the ionomer sheet 30 that is opposite the glass sheet 25. The layers 10, 25, 30 of the prelaminate assembly 110 may be adhered, as above, by the application of one or more of an adhesive, heat or pressure. In FIG. 2, a nip roller 70 is depicted as the means of adhering the prelaminate assembly 110 to form the multilayer laminate 120. Finally, in the semi-continuous process, the prelaminate assemblies 110 or the multilayer laminates 120 are separated from each other. Suitable means of separation include using a slitter 200 or a die roll to cut the rnultilayer structures into portions of the desired size.

Still referring to FIG. 2, solar cell module 120 may be formed in a semi-continuous roll-to-roll process. In this process, a solar cell and, optionally, an associated electrical connector are included in the prelaminate assembly 110. The solar cell and the electrical connector may be traditional or thin-film materials that are adhered to the glass sheet 25, or they may be flexible thin-film materials that are adhered to the film 10. The layers of these solar cell modules 120 may be adhered as set forth above, by application of one or more of heat, pressure, or an adhesive.

The following examples are provided to describe the invention in further detail. These examples, which set forth a preferred mode presently contemplated for carrying out the invention, are intended to illustrate and not to limit the invention.

EXAMPLES

A portion of SentryGlas® sheeting (200 ft in length, 35 mil in thickness) was wound up in a roll on an acrylonitrile butadiene styrene (ABS) core. The roll parameters are set forth in Table 1, below.

TABLE 1

| Roll Parameters | |
|---|---|
| Outer diameter (OD) of core | 6.4 inches |
| Inner diameter (ID) of core | 6.0 inches |
| Width of sheeting | 50 inches |
| Length of sheeting | 200 feet |
| Outer diameter of sheeting on roll | 13 inches |
| Tensions of roll | 2.25-2.0 pli |

The SentryGlas® roll was shipped to a converter's facility and stored in a cold room at about 2° C. to about 10° C. for approximately a week. After this storage period, the entire portion of sheeting was cut into sheets using a Rosenthal sheeter, available from the Rosenthal Mfg. Co., Inc., of Northbrook, Ill. The ambient conditions in the cutting room were 62° F. and 20% RH. The Rosenthal sheeter was run with an open nip and with no tension on the dancer roll. Its blade cut through the sheeting successfully, although no experiments were performed to optimize the settings for the SentryGlas® roll. Due to the lack of tension on the dancer roll, however, curling caused the sheeting to slip slightly near the end of the rolled portion.

Sheets cut from the beginning of the roll (radius of curvature approximately 6.5 inches) exhibited curling at their edges but were easily stacked in pre-press assemblies. As expected, the edge curl increased significantly in sheets that were cut from the end of the roll (radius of curvature approximately 3.2 inches). A sheet with maximum curl was flattened, however, when stacked in a pre-press assembly between lites of glass having a thickness of 2.7 mm.

The SentryGlas® sheets were laminated between lites of annealed float glass using the converter's standard autoclave cycle. The structures of the laminates and the lamination conditions are set forth in Table 2, below. Pre-press temperatures ranged from 130 to 154° F. Post autoclave inspection revealed that the laminates were satisfactory. In particular, no air was trapped in any laminate.

TABLE 2

Laminates and Lamination Conditions

| Example No. | Glass Thickness (mm) | Laminate Size* | Laminate Type** | Speed setting (ft/min) | Nip gap (inches) | Lamination Temperature (° F.) |
|---|---|---|---|---|---|---|
| 1 | 3 | A | ATTA | 22 | 0.15 | 140 |
| 2 | 3 | A | ATTA | 20 | 0.15 | 140 |
| 3 | 3 | A | ATTA | 19 | 0.15 | 145 |
| 4 | 3 | A | ATTA | 19 | 0.15 | 147 |
| 5 | 3 | A | ATTA | 19 | 0.15 | 152 |
| 6 | 3 | A | ATTA | 18 | 0.15 | 154 |
| 7 | 6 | A | ATTA | 16 | 0.30 | 130 |
| 8 | 6 | A | ATTA | 16 | 0.30 | |
| 9 | 6 | A | ATTA | 15 | 0.30 | 145 |
| 10 | 6 | A | ATTA | 15 | 0.30 | 145 |
| 11 | 6 | A | ATTA | | 0.30 | |
| 12 | 6 | A | ATTA | | 0.30 | |
| 13 | 6 | B | ATTA | 18 | 0.30 | 130 |
| 14 | 6 | B | ATTA | 18 | 0.30 | |
| 15 | 6 | B | TAAT | 18 | 0.30 | |
| 16 | 6 | B | TAAT | 18 | 0.30 | |

*Size A is 48 inches by 60 inches; Size B is 12 inches by 24 inches.
**Annealed float glass has an air side and a tin side. "ATTA" refers to a laminate that was stacked with the tin sides in contact with the interlayer sheet; "TAAT" refers to a laminate that was stacked with the air sides in contact with the interlayer sheet.

These results demonstrate that it was possible to unwind and cut the SentryGlas® roll into sheets after it had been stored in the cold room for an extended period. Moreover, defect-free safety glass laminates were made from these sheets. Importantly, both the unwinding and the laminations were carried out using standard equipment and processes under un-optimized conditions.

While certain of the preferred embodiments of the present invention have been described and specifically exemplified above, it is not intended that the invention be limited to such embodiments. It is to be understood, moreover, that even though numerous characteristics and advantages of the present invention have been set forth in the foregoing description, together with details of the structure and function of the invention, the disclosure is illustrative only, and changes may be made in detail, especially in mailers of shape, size and arrangement of parts, within the principles of the invention to the full extent indicated by the broad general meaning of the terms in which the appended claims are expressed.

What is claimed is:

1. A process for producing a glass laminate, said process comprising the steps of:

(a) unwinding a roll of thick continuous ionomeric sheeting, said ionomeric sheeting having a thickness of at least 20 mils, a length of at least 10 feet, and an aspect ratio of at least 10;

(b) cutting a sheet of a desired size from the ionomeric sheeting;

(c) preparing a pre-press assembly by stacking the sheet with at least one lite of glass; and (d) subjecting the pre-press assembly to heat, to pressure, or to both heat and pressure to produce the glass laminate;

wherein the ionomeric sheeting and the sheet are not conditioned to reduce curvature prior to stacking the pre-press assembly.

2. The process of claim 1, wherein the wound-up roll is self- supporting.

3. The process of claim 1, wherein the wound-up roll further comprises a core, and wherein the ionomeric sheeting is wound around the core.

4. The process of claim 3, wherein the core has an outer diameter of up to about 1.0 meter.

5. The process of claim 3, wherein the core has an outer diameter of about 2 inches (5.1 cm) to about 24 inches (61.0 cm).

6. The process of claim 3, wherein the core has an outer diameter of about 3 inches (7.6 cm) to about 8 inches (20.3 cm).

7. The process of claim 1, wherein the thickness is up to 20 mm.

8. The process of claim 7, wherein the thickness is 25 mils (635 micrometers) to 1.0 mm.

9. The process of claim 7, wherein the thickness is 25 mils (635 micrometers) to 0.50 mm.

10. The process of claim 7, wherein the thickness is 30 to 70 mils (762 to 1778 micrometers).

11. The process of claim 1, wherein the aspect ratio is at least 25.

12. The process of claim 11, wherein the aspect ratio is at least 50.

13. The process of claim 11, wherein the aspect ratio is at least 100.

14. The process of claim 1, wherein the glass laminate is a solar cell module, said process further comprising the step of:

including a solar cell and, optionally, an associated electrical connection in the pre-press assembly.

15. A continuous roll-to-roll process for producing a wound-up roll of a multilayer structure; said multilayer structure selected from the group consisting of a prelaminate assembly and a multilayer laminate; and said process comprising the steps of:

providing a wound-up roll of thick continuous ionomeric sheeting, said ionomeric sheeting having a thickness of greater than 20 mils (508 micrometers), a length of at least 3 m, and an aspect ratio of at least 10;

providing at least one other wound-up roll of a first other film;

unwinding the ionomeric sheeting and the other film;

aligning the ionomeric sheeting and the first other film to form a prelaminate assembly;

optionally adhering or laminating the prelaminate assembly to form a multilayer laminate; and winding the prelaminate assembly or the multilayer laminate to form the wound-up roll of the multilayer structure.

16. The process of claim 15, further comprising the steps of:

providing a second other film;

unwinding the second other film; and aligning the ionomeric sheeting and the first and second other films to form a prelaminate assembly.

17. The process of claim 16, wherein the first other film and the second other films are in contact with opposite sides of the thick ionomeric sheeting in the prelaminate assembly.

18. The process of claim 16, wherein at least one of the first other film and the second other film comprises biaxially oriented PET.

19. The process of claim 16, wherein at least one of the first other film and the second other film comprises a flexible thin film solar cell or an associated electrical connection.

20. An extrusion process for producing a wound-up roll; said wound-up roll comprising relatively thick, continuous ionomeric sheeting, said ionomeric sheeting having a thickness of greater than 20 mils (508 micrometers), a length of at least 3 m, and an aspect ratio of at least 10; wherein the improvement comprises increasing the rate at which heat is removed from the as-extruded sheeting to reduce or eliminate the heat-setting of the curvature of the ionomeric sheeting, and wherein the rate is increased by one or more steps selected from the group consisting of passing the as-extruded sheeting over a chilled water roll before taking up the sheeting into the wound-up roll; decreasing the temperature of the chilled water roll; increasing air flow across the as-extruded sheeting; altering the placement of one or more stations, including a tension control station, a tentering station, a calendering station, and an embossing station, so that the station is closer to a winding apparatus; and slowing the extrusion rate.

* * * * *